United States Patent

Spies et al.

[11] Patent Number: 5,373,722
[45] Date of Patent: Dec. 20, 1994

[54] APPARATUS FOR PERFORMANCE TESTING ACCELERATION SENSORS

[75] Inventors: Hans Spies, Pfaffenhofen; Horst Laucht, Bruckmuehl; Peter Hora; Alfons Woehrl, both of Schrobenhausen, all of Germany

[73] Assignee: Temic Telefunken Microelectronic GmbH, Heilbronn, Germany

[21] Appl. No.: 957,397

[22] Filed: Oct. 6, 1992

Related U.S. Application Data

[63] Continuation-in-part of Ser. No. 466,390, Apr. 25, 1990, abandoned.

[30] Foreign Application Priority Data

Oct. 27, 1987 [DE] Germany ............... 3736294
Oct. 20, 1988 [WO] WIPO ............. PCT/EP88/00943

[51] Int. Cl.[5] ............................... G01P 21/00
[52] U.S. Cl. ................................... 73/1 D
[58] Field of Search ............ 73/1 D, 1 DV, 2, 517 R

[56] References Cited

U.S. PATENT DOCUMENTS

| | | |
|---|---|---|
| 3,120,622 | 2/1964 | Dranetz et al. |
| 3,830,091 | 8/1974 | Sinsky ........................ 73/1 D |
| 3,870,894 | 3/1975 | Brede et al. ................... 307/9 |
| 4,823,590 | 4/1989 | Kniest et al. ............... 73/1 DV |
| 4,950,915 | 8/1990 | Spies et al. |

FOREIGN PATENT DOCUMENTS

| | | |
|---|---|---|
| 2207831 | 8/1983 | Germany. |
| 3542397 | 6/1987 | Germany. |
| 3706765 | 9/1988 | WIPO. |

OTHER PUBLICATIONS

"Airbag and Belt Pretensioner Provide Increased Safety For Driver and Front Passenger", by Brambilla, published in Automobiltechnische Zeitschrift, ATZ Nr. 84 (1982) 2, pp. 77–83.

*Primary Examiner*—Robert Raevis
*Attorney, Agent, or Firm*—W. G. Fasse; W. F. Fasse

[57] ABSTRACT

Acceleration sensors in a vehicular safety system with at least two acceleration sensors are stimulated by an electrical or sound excitation so that one of the sensors functions as a body sound transmitter, while the other(s) receive(s) these signals and vice versa. The performance which includes a calibration check, and the coupling to the housing structure are evaluated through a signal processing circuit. The safety system including its output trigger stage, remains switched-on during testing.

10 Claims, 3 Drawing Sheets

APPARATUS FOR PERFORMANCE TESTING ACCELERATION SENSORS

CROSS REFERENCE TO RELATED APPLICATION

This application is a continuation-in-part application of our copending application U.S. Ser. No. 07/466,390, filed on Apr. 25, 1990; entitled: APPARATUS FOR PERFORMANCE TESTING ACCELERATION SENSORS, now abandoned.

FIELD OF THE INVENTION

The invention relates to an apparatus for performance testing acceleration sensors, such as piezoelectric, magneto-strictive, electrodynamic, capacitive, or piezoresistive acceleration sensors. At least one such sensor is used as a measuring sensor in a triggering circuit which forms a part of a passive safety system for protecting the occupants in a motor vehicle.

BACKGROUND INFORMATION

U. S. Pat. No. 4,950,915, issued Aug. 21, 1990, corresponding to German Patent Publication (DE) 3,706,765 A1, (Spies et al.), published on Sep. 15, 1988, describes an impact sensor for a motor vehicle. The known impact sensor is arranged in a sensor housing and activates a passive safety system in response to an impact of the motor vehicle against an obstacle, whereby, for example, an airbag is inflated or a safety belt is pulled tight, etc. The known impact sensor comprises a piezosensitive acceleration detector in a sensor housing, an evaluating circuit to provide an output signal, a trigger circuit for activating the safety system in response to the output signal, and a testing circuit for testing its performance efficacy. During the testing operation, the trigger circuit is separated from the safety system. As a part of the testing circuit, an electro-acoustic or electro-mechanical converter is arranged in the sensor housing and is acoustically or mechanically coupled with the piezoelectric acceleration detector or sensor.

German Patent Publication (DE) 2,207,831 A1 (Brede et al.), published Aug. 23, 1973, discloses an impact sensor which is provided with a testing circuit for testing the performance efficacy of the impact sensor, whereby impulse amplitudes from the sensor have such a magnitude that given threshold values can be tested.

Another conventional safety system is described in an article entitled "Airbag and Belt Pretensioner Provide Increased Safety For Driver and Front Passenger", by Brambilla, published in "Automobiltechnische Zeitschrift", ATZ Nr. 84 (1982) 2, pages 77 to 83. FIG. 10 of this reference discloses a block circuit diagram with additional components for the processing of the signal produced by a single acceleration sensor. Since there is only one sensor there can be no mutual testing between at least two sensors in the above mentioned conventional safety system.

OBJECTS OF THE INVENTION

In view of the above it is the aim of the invention to achieve the following objects singly or in combination:
to provide a device capable of testing the continuous readiness and performance of the sensor or sensors in a safety system of the above type;
to avoid disconnecting the trigger circuit from the safety system while testing the sensor such as a piezoelectric sensor or sensors in the system;
to provide an impact sensor which is simple, yet compact and capable of being effective in the three coordinates of space;
to construct the sensor with its circuits so that its resonance frequency is well above the frequency of the signal sensor or sensors to assure a signal processing substantially free of system related errors; and
to permit a mutual sensor testing, whereby the sensors test each other in a system with at least two sensors so that one sensor is the tester while the other sensor is being tested and vice versa.

SUMMARY OF THE INVENTION

According to the invention there is provided an apparatus for performance testing acceleration sensors, such as piezoelectric, magneto-strictive, electrodynamic, capacitive, or piezoresistive sensors, wherein one sensor of at least two sensors serves as a testing sensor while the other sensor is being tested and vice versa, wherein both sensors are part of a trigger circuit in a passive safety system for protecting the occupants in a motor vehicle, wherein the at least two acceleration sensors are mechanically coupled to one another for being stimulated by an electrical excitation provided by a test signal generated by a test signal generator in such a manner that respectively one of the acceleration sensors functions as a transducer of structure-borne or body sound, the signals of which are received by the other acceleration sensor or sensors coupled to the one sensor for testing by a signal processing microprocessor with regard to performance, which includes a calibration test, and coupling of sound to the housing structure, whereby during the testing the trigger circuit is electrically connected with the safety system and remains ready for triggering a safety device in said passive safety system in response to an impact caused signal.

In another preferred embodiment of the invention two acceleration sensors are mounted at an angle relative to one another on a carrier which is arranged in a housing, whereby the transducer for structure-borne or body sound is arranged along a bisector of the angle enclosed by these two sensors, so that the signals from both sensors are received and tested by a signal processing micro-processor with regard to the performance, calibration, and coupling of the sensors to the housing structure, whereby the trigger circuit is not electrically separated from the safety system during the testing, but instead remains active. The above mentioned angle between the two sensors can be embodied either as a 90° angle or the two acceleration sensors enclose an angle that differs from a 90° angle.

Two sensors arranged in a common plane will be effective two-dimensionally, so to speak. On the other hand, if a third sensor is added to the two first mentioned two sensors, the system will be effective three-dimensionally.

The apparatus according to the invention can also be embodied in such a manner that the sensor arrangement which has a known resonant frequency is tested to check whether the sensor operates at its resonant frequency, whereby the sensor arrangement is so constructed that its resonant frequency is above the frequency of impact caused signals to be processed during normal operation. This feature greatly reduces system errors.

Furthermore, the apparatus can be embodied in such a manner that for testing the performance of the sensors with a test voltage impulse errors in the following signal processing such as in preamplifiers, filters, and in a central processing unit. For this purpose the pulse duration of the testing impulse is selected to be so short compared to pulse durations to be sensed due to impacts.

A short duration testing impluse essentially avoids errors that could be caused in the following signal processing by a lower duration testing impulse testing pulse durations are clearly distinguishable from any other pulse durations.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
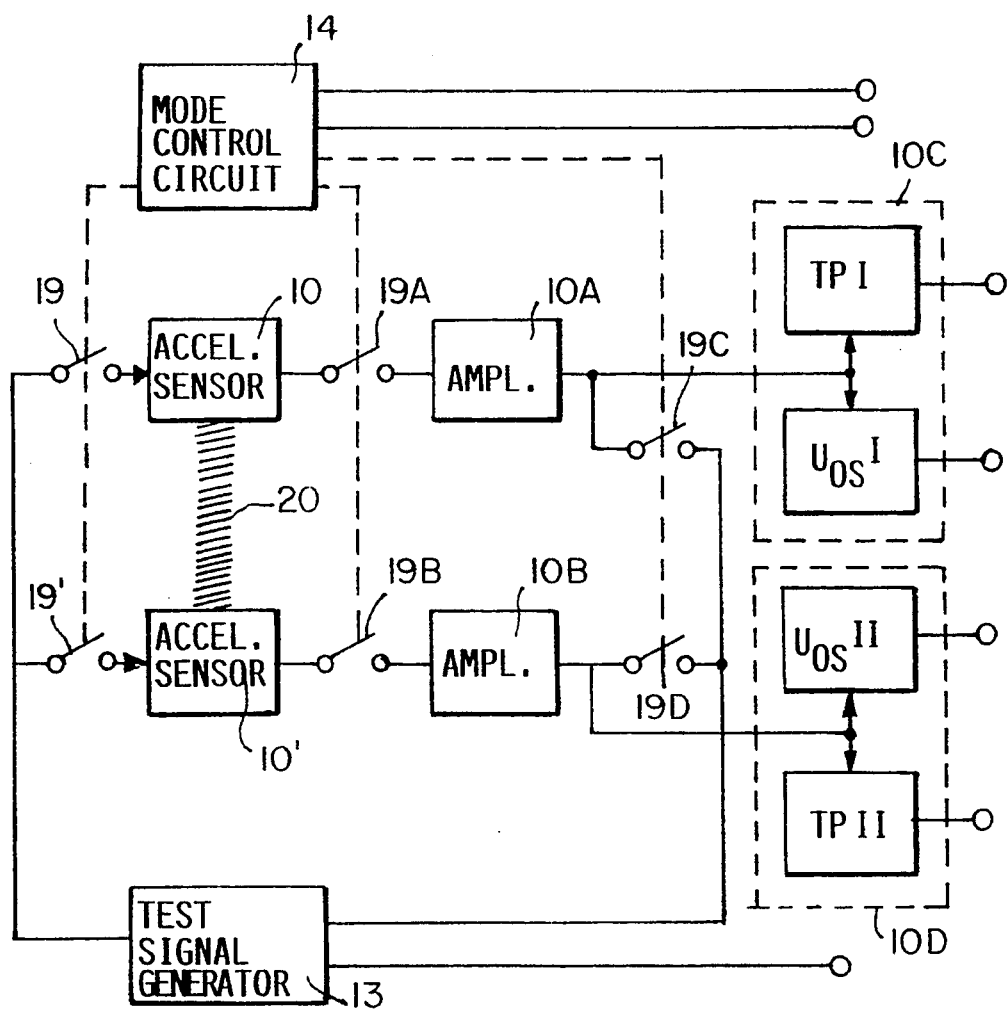
FIG. 1 is a block circuit diagram of an example embodiment, wherein the resonant frequency of two sensors and the sensor reaction to a test voltage impulse applied to the acceleration sensors, are tested.

FIG. 1 shows a sensor performance testing circuit according to the invention which provides two test possibilities or test procedures. The first test procedure involves testing of the resonance frequency of the sensors by increasing the amplitude or by varying the impedance.

The second test procedure involves testing of the sensor reaction to a testing voltage impulse applied to the so-called low input at 19 or 19' of the acceleration sensors 10 or 10'. The acceleration sensor or sensors 10, 10' may be selected from the above mentioned group and are stimulated by an electrical excitation or testing signal from a testing signal generator 13 which may be a sine wave generator. The testing signal or impulse is generated and transmitted in such a manner that, depending on the setting of the input switch 19, 19' by means of a mode control circuit 14, one of the acceleration sensors acts as a transmitter of body sound while the other sensor acts as a receiver. In other words, sound vibrations generated by sensor 10 in response to the testing signal, are transmitted through body of a mounting member 20 of the two sensors 10, 10' to the other sensor 10' for testing the other sensor or vice versa, whereby the mounting member 20 functions as a coupling.

The sensor reaction is evaluated by transmitting the sensor output signal from the sensor being tested through a switch 19A or 19B to a preamplifier 10A or 10B. Outputs of preamplifiers are connected to filter circuits 10C and 10D. As shown in FIG. 1, the filter circuit 10C comprises a band-pass filter TPI and a low-pass filter $U_{OS}I$ connected in parallel to the band-pass filter TPI. Similarly, the filter TPII and a low-pass filter $U_{OS}II$ connected in parallel to the band-pass filter TPII. The low-pass filters $U_{OS}I$ and $U_{OS}II$ transfer impact caused signals during normal operation. The band-pass filters TPI and TPII transfer the test signals resulting from the stimulation by the test signal generator 13. Further switches 19C and 19D connect the outputs of the preamplifiers 10A, 10B respectively, to an output of the testing impulse generator 13. The switches 19', 19A, and 19C are closed in synchronism with each other by the mode control circuit 14. Similarly, the switches 19, 19B, and 19D are closed in synchronism with each other by the mode control circuit 14. Thus, it is possible to test one or the other acceleration sensor 10 or 10' by the respective evaluation circuit with regard to detector performance, which includes a calibration, check and with regard to the coupling of the sensor being tested coupling to the mounting or housing structure, by evaluating the output signal of the respective sensor 10 or 10'. During this testing, the entire sensor remains active in the safety system, even though a test program or procedure is being performed at the time so that even the sensor being tested can receive an impact caused signal.

In the above mentioned reference ATZ, the performance testing takes place only after the safety system is electrically separated from the activating circuit for the safety devices, for example, through a respective switch or switches. Contrary thereto according to the invention the performance testing is carried out while the activating or triggering circuit of the safety system is electrically connected to the sensors. Thus, the triggering function is fully activated at all times, provided that the respective sensor is fully functional. This is a substantial advantage of the present system compared to the prior art.

Another advantage of the invention is seen in that the entire signal path, such as the preamplifiers 10A, 10B, the filters, and a central processing unit 11, are simultaneously tested with the respective sensor by passing the output signal from the sensor through its signal path and then evaluating that output signal in the central processing unit 11 to be described in more detail below with reference to FIG. 2.

Each of the sensors 10 or 10' can be used, either as a sensor or as a transducer. In the sensor mode the sensor operates as a receiver. In the transducer mode the sensor operates as a transmitter of body sound. Thus, it is possible to test one of the sensors with the other and vice versa. The switch 19A, connects the preamplifier 10A into its path. The switch 19B connects the preamplifier 10B into its path.

Figure 2:
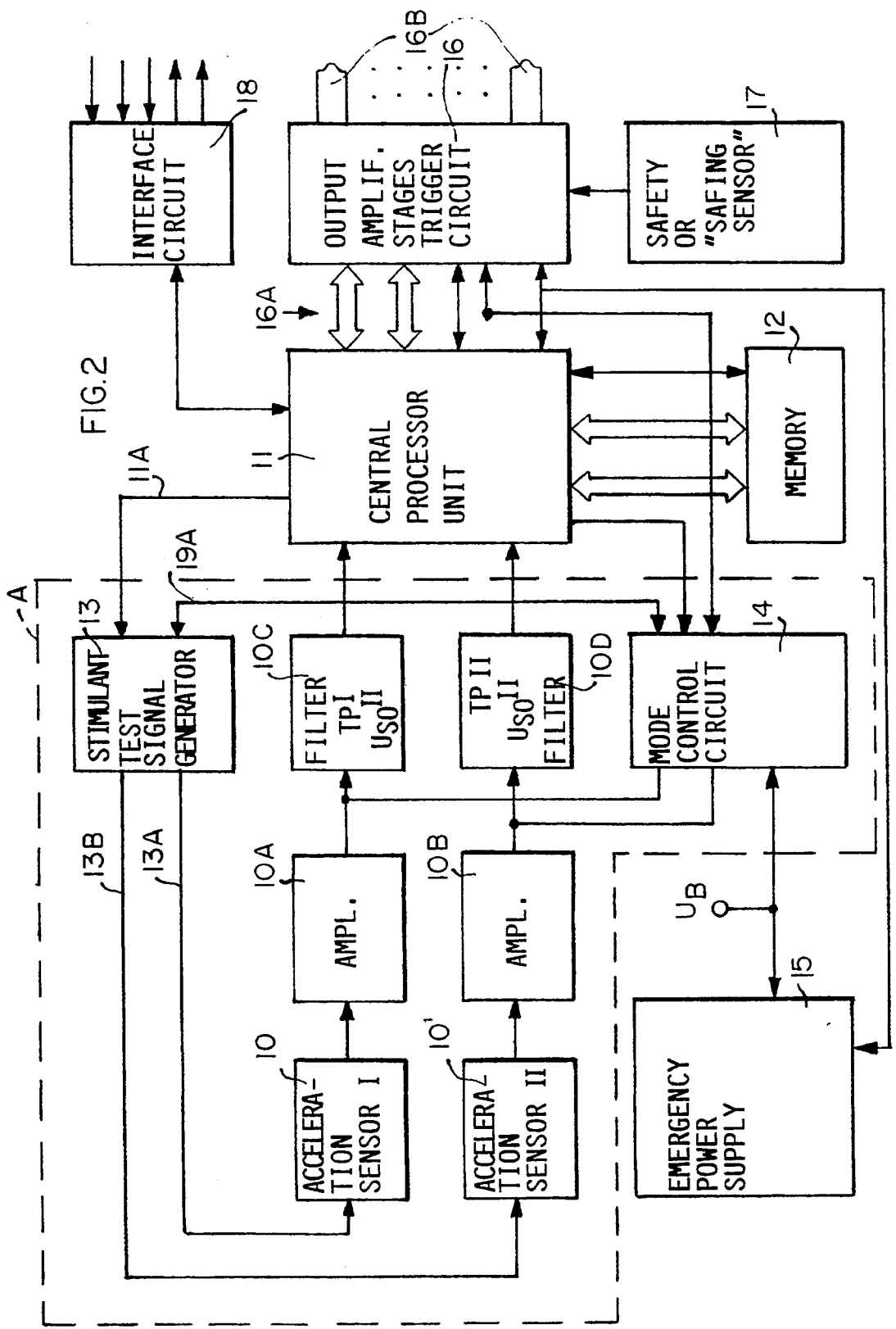
FIG. 2 is a block circuit diagram of another example embodiment for performance testing of acceleration sensors, whereby the trigger circuit of the safety system is also shown.

Referring to FIG. 2, section A encircled by a dashed line corresponds to FIG. 1. The central processing unit 11, for example, a microprocessor, controls the performance testing operations, such as operability, calibration, and coupling of the sensors to the housing structure to assure the continued proper performance of the safety system. The central processing unit 11 is connected to a memory 12, wherein the programs for the testing are stored. These programs test the sensitivity, the band width, and the resonance frequency of one or the other or both sensors. Any other desirable test programs may also be stored in the memory 12. These programs will also test the other components within a signal path or any other sensors such as piezoelectric sensors in the system. Respective parameters are stored in the memory 12 for these purposes and these parameters may involve tests with reference to fixed values, with reference to limit values, or even with reference to acceptable tolerance ranges.

A control output 11A of the central processing unit 11 is connected to an input of the test signal generator 13 shown in FIG. 1 having two outputs 13A and 13B. The test signal output 13A is connected to the first acceleration sensor 10 while the test signal output 13B is connected to the second acceleration sensor 10'. The test signal generator 13 provides the required excitation or test signal for one of the sensors at a time, either electrically, magnetically, or mechanically. When one of the sensors is excited, the other sensor is being tested and vice versa. Specifically, assuming that the first sensor 10 is excited, the second sensor 10' will receive the respective vibrations or excitations during the testing to provide an output signal that is being evaluated. During the first testing sequence or procedure mentioned above, one of the sensors always functions as a test signal generator while the other sensor functions as a receiver, if it functions properly, and vice versa. The required tests are performed by the processor 11 in cooperation with the mode control circuit 14 which determines the timing when the test signal generator 13 will issue test signals and when the switches 19, . . . are closed. This so-called mode control by the circuit 14 determines when test signals are issued and for what signal time durations. Although normal testing involves application of the test signals to one of the sensors 10 or 10', it is also possible to apply testing to both sensors simultaneously by closing the switches 19 and 19', . . . simultaneously for the required time duration.

In FIG. 2 the mode control circuit 14 is connected to an emergency power supply 15 to supplement the battery voltage $U_B$ if the latter should be subject to a voltage drop, voltage variations, or the like so that the testing can take place independently of the battery voltage $U_B$ if necessary. The emergency power supply 15 is also connected to the central processing unit 11 and to the output amplifier stages 16 to assure the operation of these components at all times. Databuses 16A connect the central processor unit 11 to the output amplifier stages 16, which cause the triggering of the safety devices, for example, by igniting squibs 16B that will cause the required gas generation for inflating an airbag or two.

However, rather than connecting the end stages 16 constantly to the central processing unit 11, it is possible to provide a so-called "safing sensor" 17 connected to the end stages 16 which activates these end stages only in response to a crash, more specifically, in response to an acceleration or deceleration signal that exceeds a certain preset threshold value.

An interface circuit 18 connects the central processing unit 11 to other components in the vehicle not shown. Such other components may, for example, comprise a display on the dashboard for indicating to the driver the current status of the system. Through the interface circuit 18 it is possible to store, for example in the memory 12, values relating to the particular vehicle and to also supply signals that represent, for example, the performance testing results of the acceleration sensors to components in the vehicle, such as the above mentioned display to display these test results.

In FIG. 2 the first sensor 10 is connected through the amplifier 10A and a filter 10C to the central processing unit 11. The second sensor 10' is connected through the amplifier 10B and a further filter 10D to the central processing unit 11. The connection of the just mentioned signal flow path through the amplifiers 10A, 10B and filters 10C, 10D to the control processing unit 11 is controlled by the mode control circuit 14.

Figure 3:
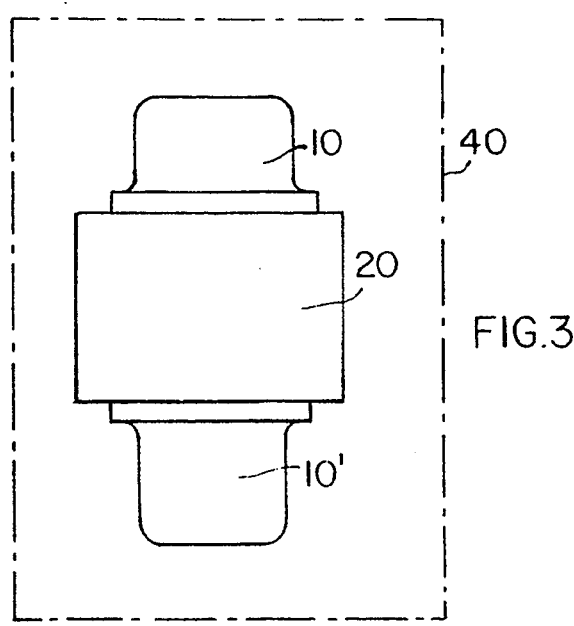
FIG. 3 shows a schematic diagram of two acceleration sensors arranged "in-line" and attached to a common support acting as a coupling between the sensors.

FIG. 3 shows one mounting embodiment according to the invention, wherein the two sensors 10 and 10' are connected to the end faces of the mounting or coupling member 20, such as an aluminum cylinder, which in turn is secured to a housing 40. The in-line arrangement of the sensors in FIG. 3 is merely for redundancy purposes. However, in the embodiment of FIG. 4, the two sensors 10 and 10' are secured to a prism mounting member 20A having for example a triangular cross-section with at least two sides extending at right angles to one another. The sensors 10 and 10' are connected to these two sides so that their central axis A1 and A2 enclose an angle of 90° as shown in FIG. 4.

Figure 4:
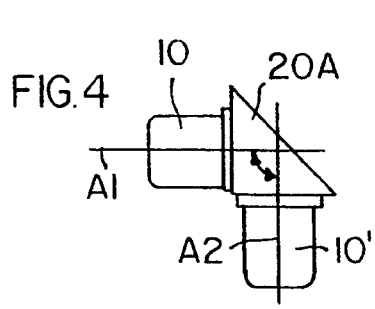
FIG. 4 shows a schematic diagram of two acceleration sensors arranged in the same plane but angularly spaced from each other by 90°.
Figure 5:
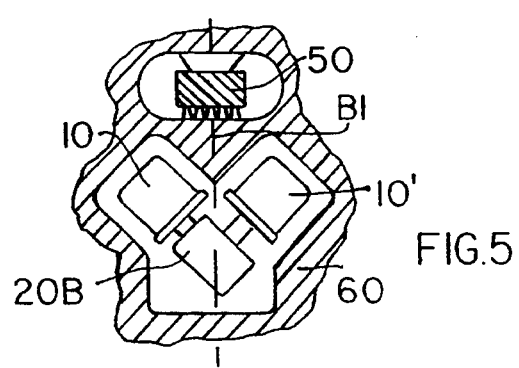
FIG. 5 shows a schematic diagram of two acceleration sensors arranged in a common housing with a testing transducer.

FIG. 5 shows the sensors 10 and 10' mounted on a mounting member 20B having a rectangular cross-section whereby the mounting member 20B itself is mounted with its sensors in a cavity of a housing 60. In FIG. 5, the sensors also are spaced angularly from one another by an angle of 90° as in FIG. 4. An angle bisector B1 divides the 90° angle into two 45° angles. A testing signal generator 50, such as a sound generator, is mounted in a further cavity in the housing 60. The bisector B1 passes centrally through the further cavity in the housing 60 and the sound generator 50 is mounted symmetrically relative to the bisector B1 so as to expose both sensors 10, 10' uniformly to body sound that is transmitted from the generator 50 through the body of the housing 60 to the sensors 10, 10'. As a result, both sensors are simultaneously tested rather than one at a time as in the embodiment of FIG. 3. However, in both instances, simultaneous testing or individual sequential testing, the performance efficacy is ascertained by evaluating the respective output signal or signals from the sensors in the circuit of FIG. 2, and such evaluation takes place without separating the sensors from the safety system for the testing.

Due to the angular spacing of the sensors 10, 10' in the embodiments of FIGS. 4 and 5, these embodiments are capable of sensing body impacts within this angular range.

Figure 6:
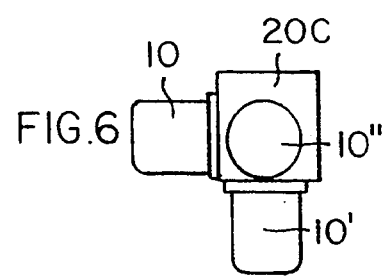
FIG. 6 shows an arrangement of three transducers, whereby each transducer faces in one of the three directions of a three-dimensional coordinate system.

FIG. 6 shows an embodiment with three sensors 10, 10', and 10". All three sensors are secured to surfaces of a mounting block 20C. The surfaces of the mounting block also functioning as a coupling member, extend at right angles to one another so that the sensors of this embodiment are capable of sensing in the three directions of a three-dimensional coordinate system. A respective testing circuit would have three channels instead of the two channels shown in FIG. 2.

According to the invention, the sensors 10, 10', 10" have a resonance frequency which is selected to be higher than any of the signal frequencies of signals caused by an impact to be evaluated in the safety system. The testing signals have a frequency corresponding to the resonance frequency, and are thus also higher than the signal frequencies to be expected from an impact. Thus, it is assured that the testing signals are clearly separated from a crash caused signal by the above mentioned filters. This is so even if the two signals, namely the testing signal and the crash caused signal simultaneously at the same sensor.

Although the invention has been described with reference to specific example embodiments, it will be appreciated that it is intended to cover all modifications and equivalents within the scope of the appended claims.

What we claim is:

1. An apparatus for performance testing acceleration sensors in a vehicular safety system including a trigger circuit for triggering safety means, comprising at least two acceleration sensors, a mounting coupling said acceleration sensors to each other, a test signal generator for generating a testing signal, means for applying said testing signal to at least one of said acceleration sensors for exciting said one acceleration sensor to function as a transmitter of body sound in a testing mode, said body sound being received by the other of said acceleration sensors for testing said other acceleration sensor, circuit means connecting outputs of said acceleration sensors to said trigger circuit, a signal processing circuit including a central processing unit and a mode control circuit interconnected for testing said one acceleration sensor with regard to its performance and with regard to its coupling to said mounting, whereby during testing said trigger circuit remains electrically connected with said safety system and continuously ready to be triggered by an impact caused signal even during a testing mode of the system.

2. The apparatus of claim 1, wherein said testing signal enables said one acceleration sensor to function as said transmitter of body sound.

3. The apparatus of claim 1, wherein said mounting is a mechanical coupling element (20) positioned between said at least two acceleration sensors (10, 10'), one of said acceleration sensors (10) being arranged on one end face of said coupling element (20) and the other acceleration sensor (10') being arranged on the opposite end face of said coupling element (20), wherein said test signal generator is a sine wave generator (13), wherein said acceleration sensors are piezoelectric acceleration sensors, one of said piezoelectric acceleration sensors being connected to said sine wave generator (13), the other of said piezoelectric acceleration sensors being coupled through said signal processing circuit to said central processing unit for processing impact caused signals and test generated signals.

4. The apparatus of claim 1, wherein said mounting for said acceleration sensors comprises a prismatic carrier with a triangular cross-section, and wherein one acceleration sensor is secured to one side of said triangular cross-section while the other acceleration sensor is secured to another side of said triangular cross-section so that an angle is enclosed by central axes of said acceleration sensors.

5. The apparatus of claim 4, wherein said angle is 90°.

6. The apparatus of claim 1, wherein said mounting for said acceleration sensors comprise a prismatic carrier with a rectangular cross-section, and wherein one acceleration sensor is secured to one side of said rectangular cross-section while the other acceleration sensor is secured to another side of said rectangular cross-section so that an angle is enclosed by central axes of said acceleration sensors.

7. The apparatus of claim 6, wherein said angle is 90°.

8. The apparatus of claim 1, wherein said mounting comprises a block having at least three mounting surfaces arranged at right angles relative to each other, and wherein said acceleration sensors comprise three acceleration sensors, one of which is mounted on each of said three mounting surfaces, whereby axes of said three acceleration sensors extend in the three directions of a three-dimensional coordinate system.

9. The apparatus of claim 1, wherein said acceleration sensors are tested with regard to their resonant frequency, and wherein said resonant frequency is higher than the frequency of detected impact caused signals, said apparatus remaining operational during testing.

10. The apparatus of claim 1, wherein said test signal generator produces a test voltage impulse for testing the sensor performance, said test voltage impulse having an impulse duration so short in duration that essentially no error is caused in said connecting circuit means and in said signal processing circuit.

* * * * *

UNITED STATES PATENT AND TRADEMARK OFFICE
CERTIFICATE OF CORRECTION

PATENT NO. : 5,373,722
DATED : December 20, 1994
INVENTOR(S) : Spies et al.

It is certified that error appears in the above-indentified patent and that said Letters Patent is hereby corrected as shown below:

Column 3, line 11, replace "impluse" by --impulse--;
Column 3, line 13, replace "lower" by --longer--, after "impulse" insert --because short--;
         line 59, delete "or impulse".

Column 4, line 48, after "filters" insert --10C, 10D--.

Column 6, line 11, replace "path" by --paths--;
         line 12, replace "control" by --central--.

Signed and Sealed this

Twenty-ninth Day of August, 1995

Attest:

BRUCE LEHMAN

*Attesting Officer*     *Commissioner of Patents and Trademarks*